(12) United States Patent
Lee

(10) Patent No.: US 7,430,751 B2
(45) Date of Patent: Sep. 30, 2008

(54) DATA RECORDING/REPRODUCING APPARATUS WITH AN IMPROVED STRUCTURE FOR SECURELY SUPPORTING A FRONT PANEL

(75) Inventor: Sang-in Lee, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 421 days.

(21) Appl. No.: 11/185,876

(22) Filed: Jul. 21, 2005

(65) Prior Publication Data
US 2006/0020956 A1  Jan. 26, 2006

(30) Foreign Application Priority Data
Jul. 21, 2004  (KR) .................. 10-2004-0056681

(51) Int. Cl.
*G11B 33/12* (2006.01)
(52) U.S. Cl. ..................................... 720/652
(58) Field of Classification Search .............. 720/652
See application file for complete search history.

(56) References Cited

U.S. PATENT DOCUMENTS 5,596,484 A * 1/1997 Suzuki ................. 361/685

2004/0057201 A1  3/2004 Hartung et al.
2005/0097583 A1* 5/2005 Okumura ................. 720/652
2005/0210486 A1* 9/2005 Shibata et al. ............ 720/652

FOREIGN PATENT DOCUMENTS

| EP | 0 843 512 | 5/1998 |
|---|---|---|
| EP | 1 257 162 | 11/2002 |
| JP | 62-223878 | 10/1987 |
| KR | 91-20937 | 12/1991 |
| KR | 20-0152476 | 1/1999 |
| KR | 2000-0012357 | 7/2000 |

* cited by examiner

*Primary Examiner*—David D Davis
(74) *Attorney, Agent, or Firm*—Staas & Halsey LLP

(57) ABSTRACT

A data recording/reproducing apparatus that includes an open front housing having a base frame and a cover frame, a recording/reproducing unit installed in the housing to record and/or reproduce data from a predetermined recording medium, a circuit board installed parallel to the recording/reproducing unit in the housing, a front unit connected to the open front of the housing to support operation buttons, a first locking unit which locks the front unit and the recording/reproducing unit, and a second locking unit which locks the front unit and the housing at a position corresponding to the circuit board.

16 Claims, 9 Drawing Sheets

DATA RECORDING/REPRODUCING APPARATUS WITH AN IMPROVED STRUCTURE FOR SECURELY SUPPORTING A FRONT PANEL

CROSS-REFERENCE TO RELATED APPLICATION

This application claims benefit under 35 U.S.C. § 119(a) from Korean Patent Application No.2004-56681, filed on Jul. 21, 2004, the entire contents of which are incorporated herein by reference.

BACKGROUND OF THE INVENTION

1. Field of the Invention

The present invention relates in general to a data recording/reproducing apparatus. More particularly, the present invention relates to a data recording/reproducing apparatus accommodating a data recording/reproducing unit in a box-shaped housing 2. Description of the Related Art In general, data recording/reproducing apparatuses such as DVD players, VCRs, digital audio discs, and video discs accommodate a data recording/reproducing unit in a housing. Depending on which kind of recording medium is used, the data recording/reproducing units can be categorized into magnetic recording/reproducing units and (optical) disc recording/reproducing units. A recent trend shows that a 'combo system' adopting both the magnetic recording/reproducing unit (i.e., a VCR deck) and the optical disc reproducing unit (i.e., a DVD deck) is being widely used.

FIG. 1 is a perspective view of a data recording/reproducing apparatus adopting a VCR deck 20 in a housing 10. As shown in FIG. 1, the housing 10 includes a base frame 11 with side walls, a rear frame 12, a cover frame (not shown) and a front panel (not shown). The frames except for the front panel are usually made of metallic materials. On the other hand, the front panel is a plastic mold product and has a certain design to increase the functional (such as the installation of operation buttons) and aesthetic value.

Meanwhile, the VCR deck 20 and a circuit board 30 are installed side by side in the housing 10. The VCR deck 20 is locked on the base frame 11 and connected to the front panel.

As such, the front panel is disposed between the base frame 11 and the cover frame (not shown), and is also locked onto the VCR deck 20. However, the VCR deck 20 is installed more closely to the edge. Hence, only part of the front panel is connected to the VCR deck. The rest of the front panel is not supported by the VCR deck 20 and is therefore structurally weak and vulnerable. Therefore, if a user keeps pulling at or grasping the front panel, the part of the front panel that is not supported by the VCR deck 20 becomes elastically deformed. Then the front panel is no longer adhered to the base frame 11 or the cover frame and a space is created therebetween, which is not aesthetically pleasing. Overall, the reliability of the front panel and the data recording/reproducing apparatus accommodating the same becomes deteriorated

SUMMARY OF THE INVENTION

One aspect of the present invention is to provide a data recording/reproducing apparatus with an improved structure for securely supporting a front panel according to an aspect of the present invention.

According to an embodiment of the present invention, there is provided a data recording/reproducing apparatus, which includes: an open front housing having a base frame and a cover frame; a recording/reproducing unit installed in the housing to record/reproduce data in/from a predetermined recording medium; a circuit board installed in near to the recording/reproducing unit in the housing; a front unit connected to the open front of the housing to support operation buttons; a first locking unit which locks the front unit and the recording/reproducing unit; and a second locking unit which locks the front unit and the housing at a position corresponding to the circuit board.

According to an embodiment of the present invention, the second locking unit includes: a hook member protrudingly formed from the front unit into the housing; and a locking bracket detachably installed in the housing to be combined with the hook member.

According to an embodiment of the present invention, the hook member is made of plastic materials, and has a locking hole where one end of the locking bracket is inserted.

According to an embodiment of the present invention, the locking bracket is installed in an upright position against the base frame.

According to an embodiment of the present invention, a holding unit in a predetermined shape is formed on the base frame to hold or support the locking bracket.

According to an embodiment of the present invention, the locking bracket is supported by the base frame, and the circuit board has a through hole for the locking bracket to pass through.

According to an embodiment of the present invention, the locking bracket includes: a base adhered to the base frame; a locking caster that is bent at the base and extended upwards to a same height with the hook member; and a board support that is bent at the base at a predetermined height to support the circuit board.

According to an embodiment of the present invention, the base has a screw hole to screw the locking bracket to the base frame.

According to an embodiment of the present invention, a position determining unit is formed on the locking bracket and the base frame, respectively, to determine the installation position of the locking bracket to be reciprocably connected to the base frame.

According to an embodiment of the present invention, the front unit includes: a plastic front panel; and a plastic rear panel connected to the rear side of the front panel and having the hook member.

According to an embodiment of the present invention, the recording/reproducing unit is a disc recording/reproducing unit.

According to an embodiment of the present invention, the recording/reproducing unit is installed more closely to an edge on one side of the housing, and the circuit board is installed more closely to an edge on the other side of the housing.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
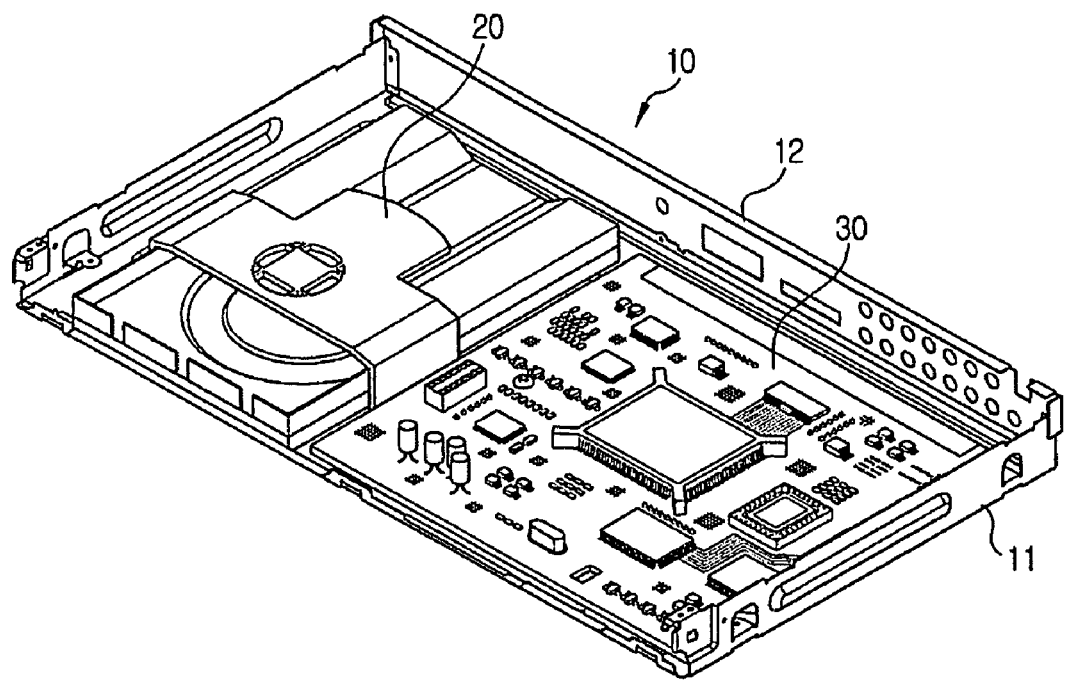
FIG. 1 is a schematic perspective view of a related art data recording/reproducing apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
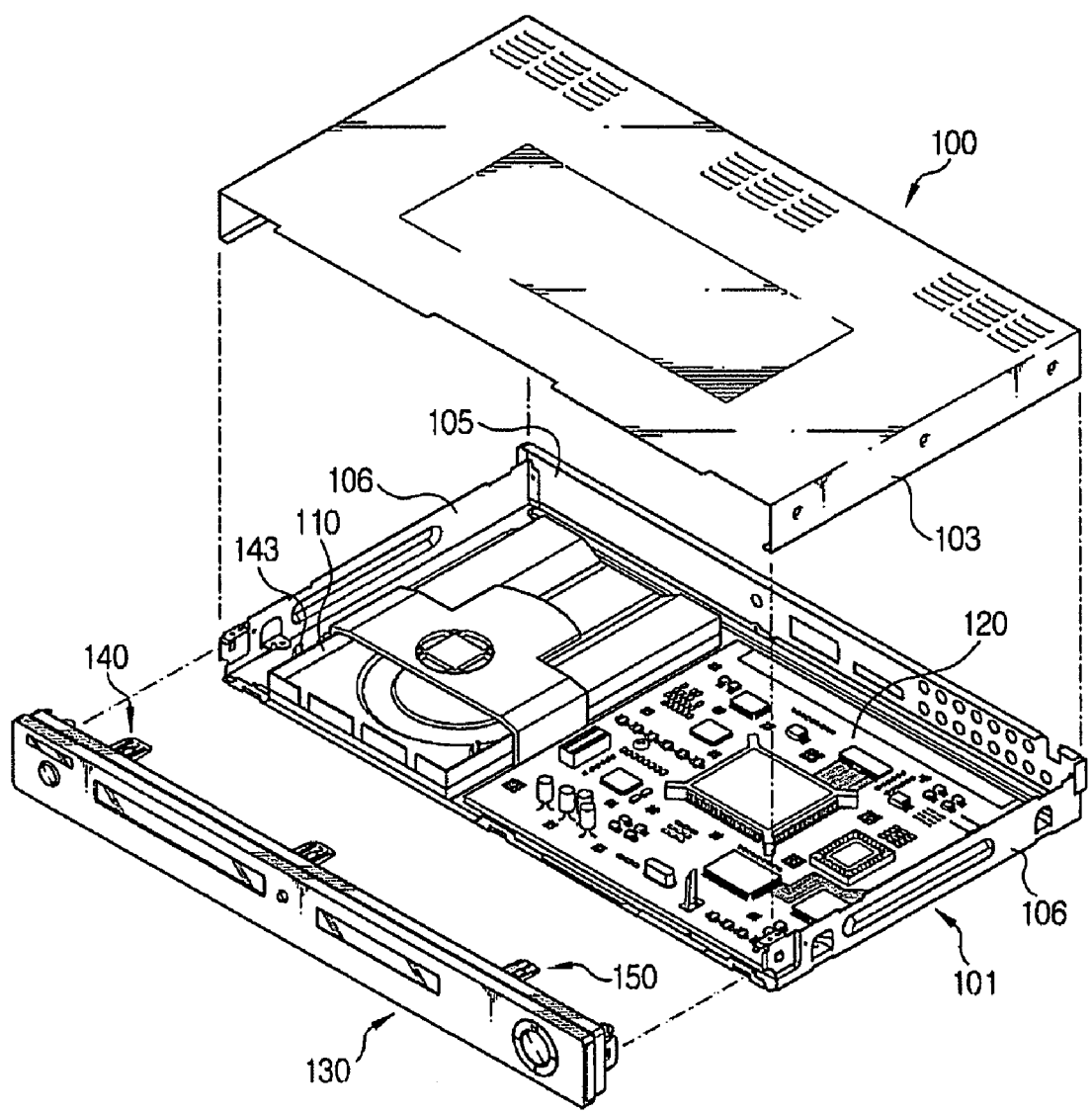
FIG. 2 is an exploded perspective view of a data recording/reproducing apparatus according to one embodiment of the present invention.

Referring to FIG. 2, the data recording/reproducing apparatus of the present invention includes a housing 100, a recording/reproducing unit 110, a circuit board 120, a front unit 130, a first locking unit 140 and a second locking unit 150.

The housing 100 is formed by connecting metallic frames in a box shape. Therefore, the housing 100 includes a base frame 101, a cover frame 103, and a rear frame 105. The base frame 101 has side walls 106 that are bent upwards to be combined with the base frame 101.

After the base frame 101, the cover frame 103, and the rear frame 105 form the box-shaped housing 100 with the entire front opened, the front unit 130 is then connected to the open front housing 100.

The recording/reproducing unit 110 and the circuit board 120 are installed side by side on the base frame 101. Particularly, the recording/reproducing unit 110 (hereinafter it will be referred to as a DVD deck) of the present invention may be a DVD deck for recording/reproducing data on/from a (optical) disc. The DVD deck 110 is screwed onto the base frame 101, and the circuit board 120 for controlling the operation of the DVD deck 110 is also screwed onto the base frame 101. Here, the DVD deck 110 and the circuit board 120 are installed in such a manner that both are closer to the edge on each side.

Figure 3:
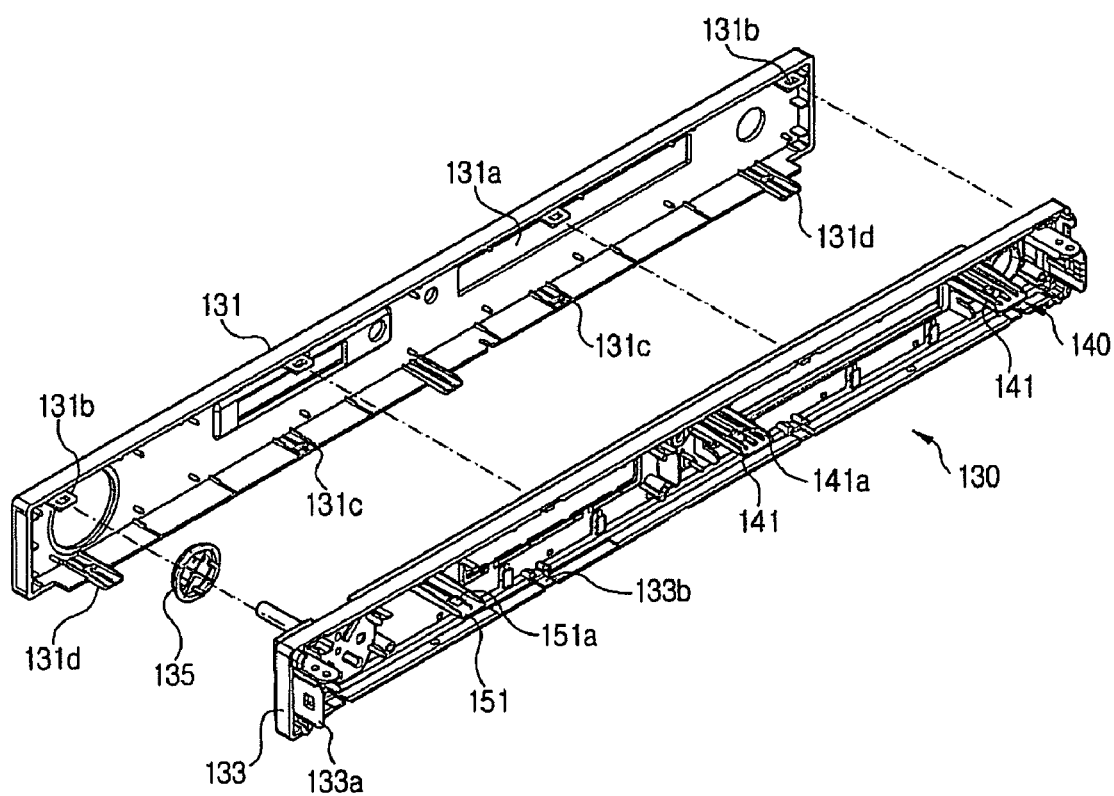
FIG. 3 is an exploded perspective view of a front unit of FIG. 2.

As shown in FIG. 3, the front unit 130 includes a front panel 131 and a rear panel 133. The front panel 131 is a plastic molded object, and exposed to outside. The front panel 131 has a door 131a, through which a user inserts a recording medium to be mounted on the DVD deck 110. Also, a plurality of hooks 131b is attached at regular intervals to the top portion of the inner side of the front panel 131 to be locked into the rear panel 133. Similarly, a plurality of locking holes 131c are formed on the lower portion of the inner side of the front panel 131 so that hooks 133b on the rear panel 133 can be inserted into the holes, respectively. Also, a plurality of locking hooks 131d is protruded from the lower portion of the front panel 131 to be locked into the base frame 101.

The rear panel 133 is connected to the rear surface of the front panel 131. The rear panel 133 is a plastic molded object so that it can be deformed slightly by an external force. The real panel 133 also supports the circuit board in correspondence to the operation button 135. On both sides of the rear panel 133 are elastic hooks 133a to be combined with the side walls 106 of the base frame 101.

Figure 4:
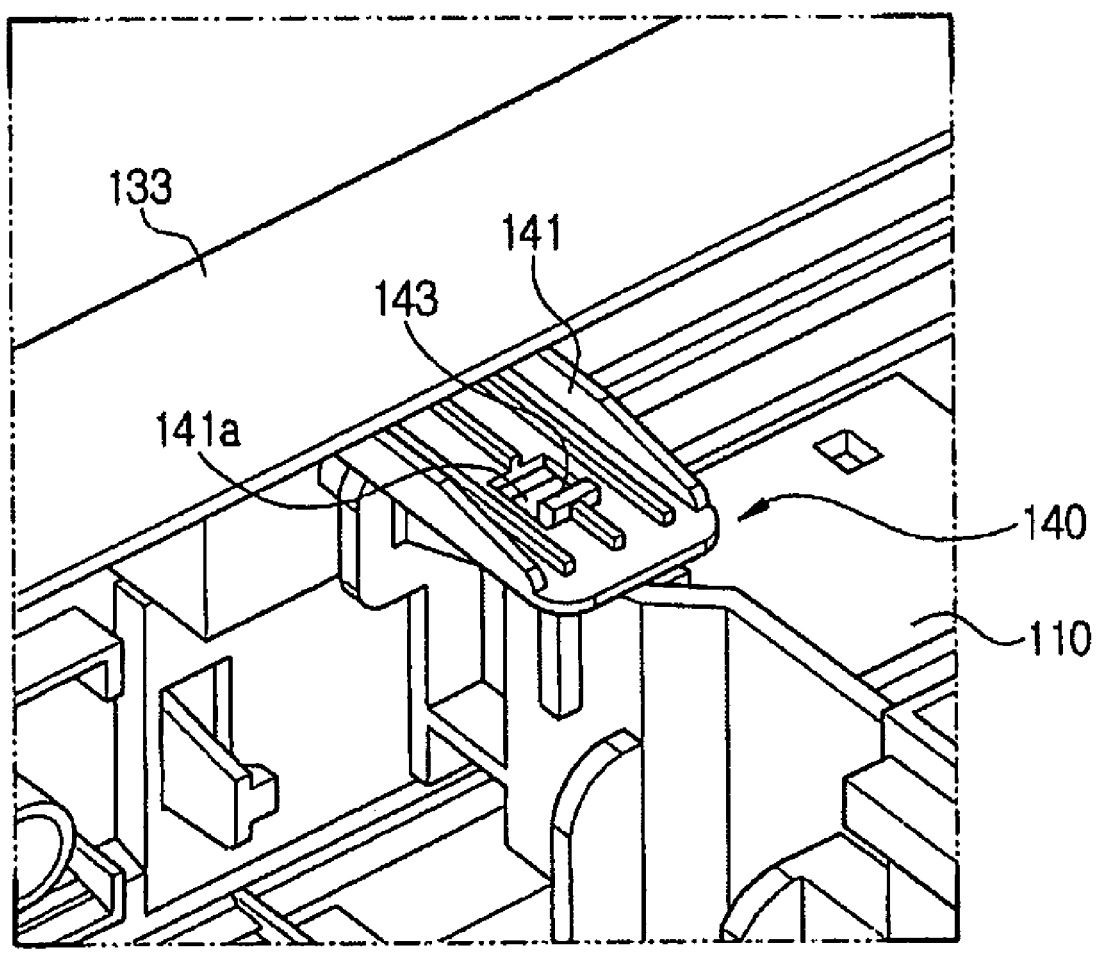
FIG. 4 is a diagram for explaining how the front unit of FIG. 2 is connected to a DVD deck.

The rear panel 133 is locked to the DVD deck 110 by the first locking unit 140. As shown in FIGS. 3 and 4, each of the first locking unit 140 includes a pair of hook members 141 that are formed on one side of the rear panel 133 (more specifically, at positions corresponding to the DVD deck 110), and a locking projection 143 formed on the DVD deck 110 to be in correspondence to each of the hook members 141. A locking hole 141a is also formed in each hook member 141. Therefore, when the hook member 141 is elastically deformed it contacts the locking projection 143, and the locking projection 143 is inserted into the locking hole 141a. FIG. 4 illustrates a state where the locking projection 143 is inserted into the locking hole 141a. The locking projection 141 is connected to the DVD deck 110. In this manner, the rear panel 133 is locked to the DVD deck 110 the first locking units 140, and the front unit 130 is securely fixed to a position corresponding to the DVD deck 110.

Figure 5:
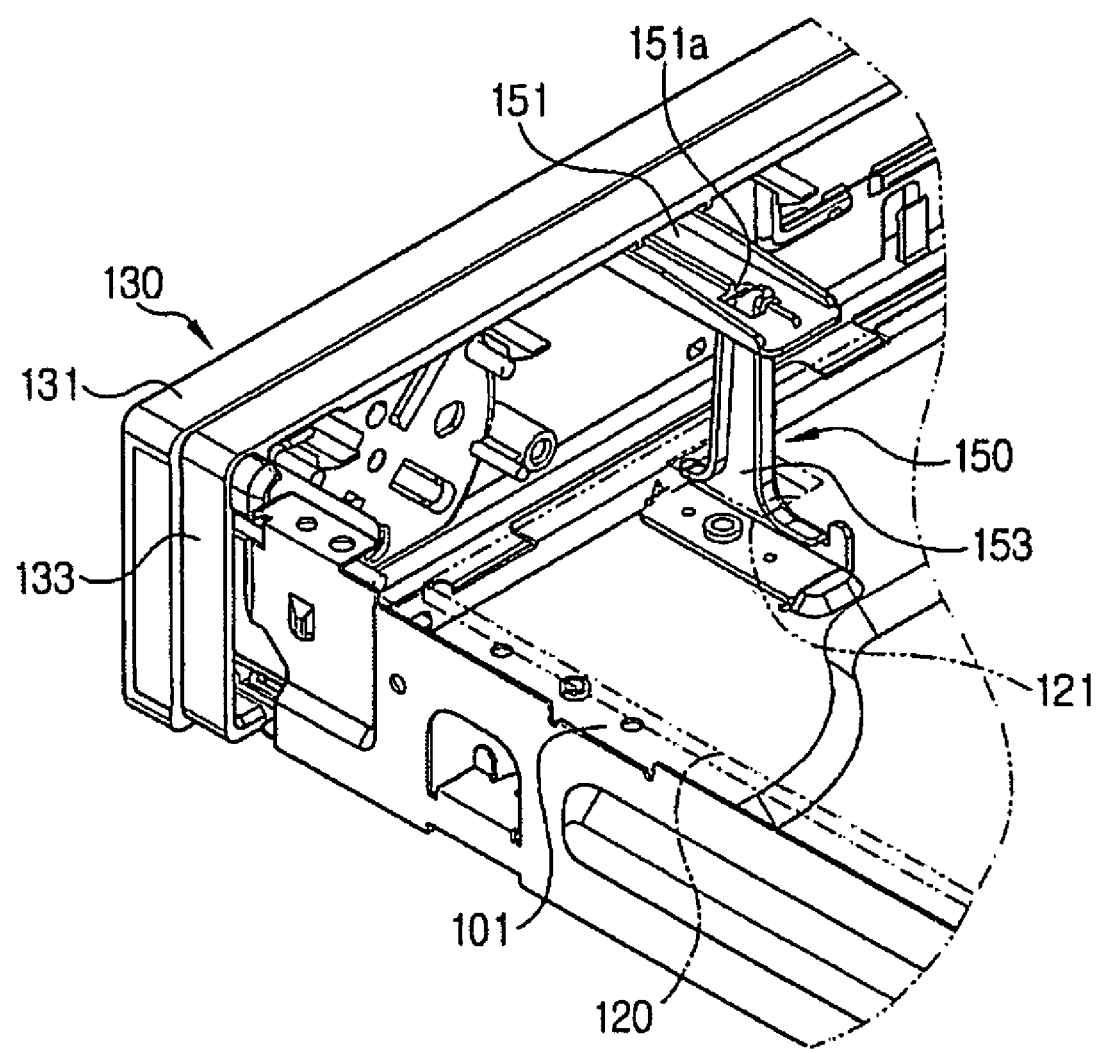
FIG. 5 is a perspective view of a second locking unit for locking the front unit onto a housing.

Referring to FIG. 3 and FIG. 5, the second locking unit 150 includes a hook member 151 formed on the rear panel 133 of the front unit 130, and a locking bracket 153 installed at the base frame 101 to be combined with the hook member 151.

The hook member 151 is made of a plastic material and connected to the rear panel 133 to be elastically deformable. The hook member 151 has a locking hole 151a formed therein. According to an aspect of the present invention, the hook members 141 and 151 are spaced about the same distance apart. The hook member 151 is installed at a position corresponding to the position of the circuit board 120, and (flexibly) extended over the rear panel 133.

According to an aspect of the present invention, the locking bracket 153 can be made separately. In effect, the locking bracket 153 is selectively installed as required at a predetermined position on the base frame 101. The locking bracket 153 is usually made of high strength metals; therefore, it can support the hook member 151 very stably.

Figure 6:
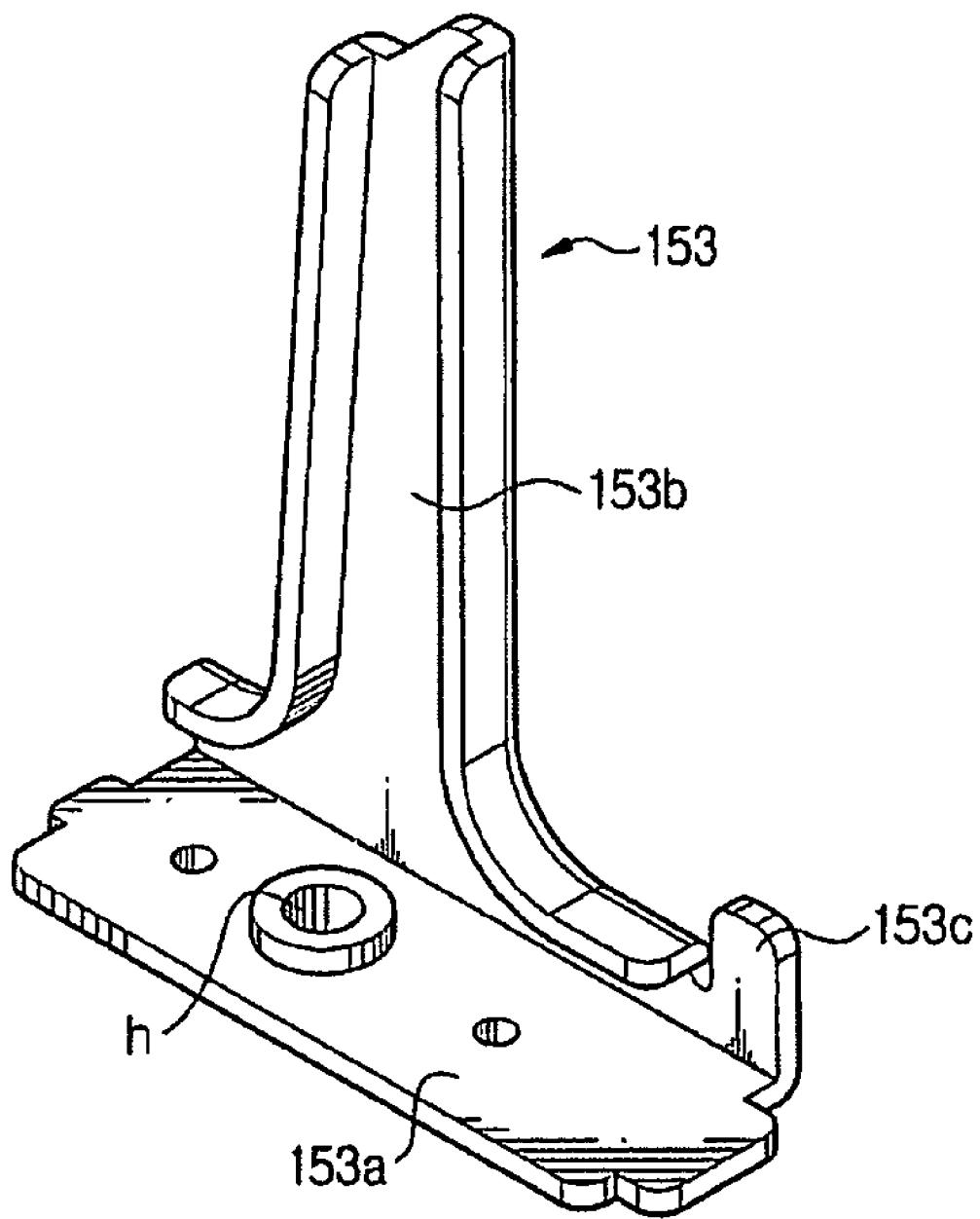
FIG. 6 is a perspective view of a locking bracket of FIG. 5.

As shown in FIG. 6, the locking bracket 153 is composed of a base 153a that is closely adhered to the base frame 101, a locking caster 153b that is bent at the base 153a and extended upwards to a predetermined height, and a board support 153c.

The locking caster 153b is taller than, or is the same height as the hook member 151, so that the end of the locking caster 153b can be inserted into the locking hole 151a formed in the hook member 151.

The board support 153c is shorter than the locking caster 153b to support the bottom of the circuit board 120. Therefore, the base 153a and the board support 153c are covered by the bottom of the circuit board 120. On the other hand, the locking caster 153b is protruded upwards from the circuit board 120. To this end, the circuit board 120 has a through hole 121 (in FIG. 5) for the locking caster 153b to pass through.

Figure 7:
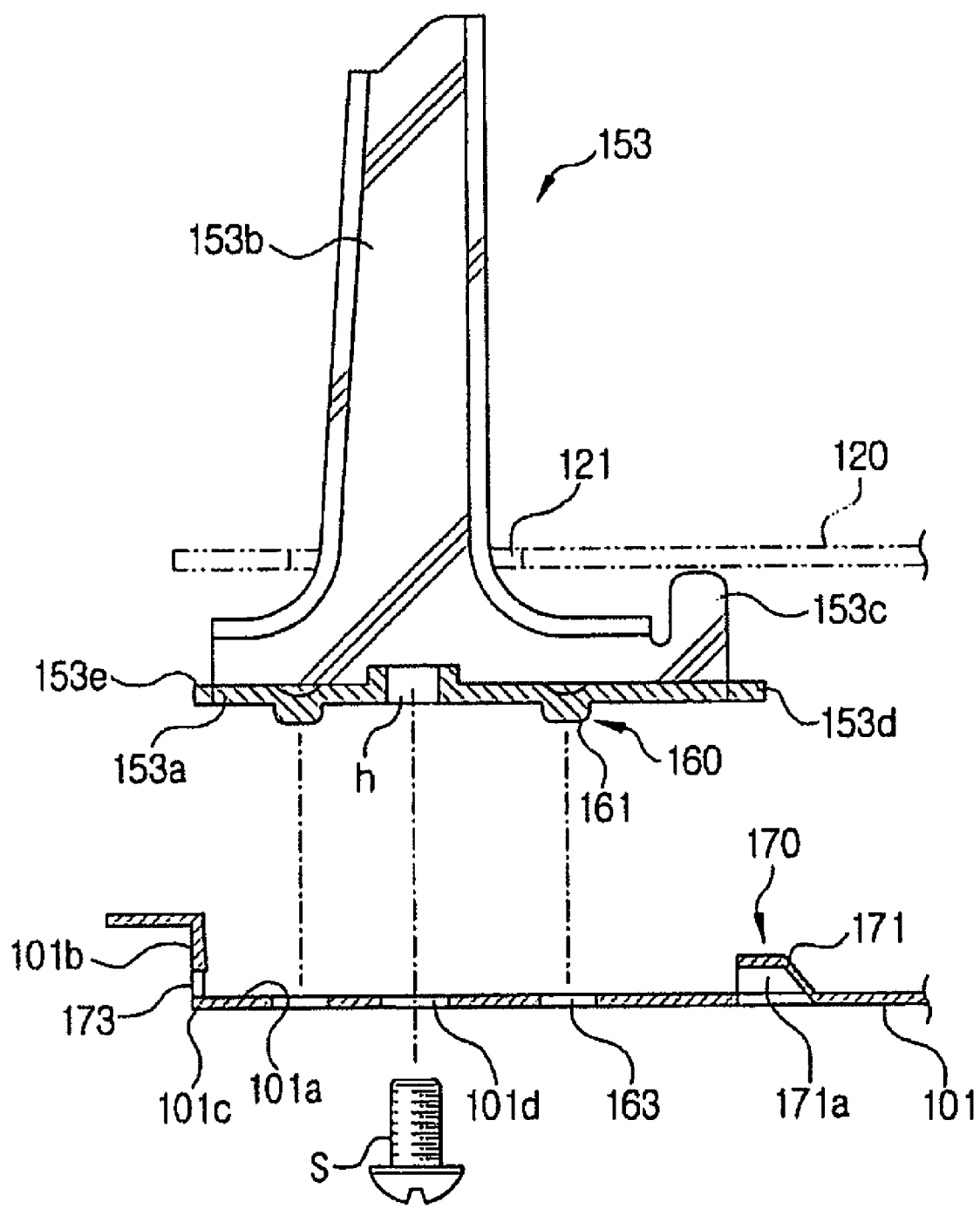
FIG. 7 is a cross-sectional view illustrating a state before a locking bracket of FIG. 5 is connected to a base frame.

Also, the base 153a has a screw hole (h) into which a screw is inserted. As illustrated in FIG. 7, there is a position determining unit 160 for determining an installation position of the locking bracket 153 on the base frame 101. The position determining unit 160 includes a plurality of position determining projections 161 that formed on the base 153a of the locking bracket 153, and position determining grooves 163 that are reciprocably formed in the base frame 101 for combination with the position determining projections 161. Here, the positions of the position determining projections 161 and the position determining grooves 163 may be exchanged with each other.

Moreover, a holding unit 170 is formed on the base frame 101. The holding unit 170 holds or supports the locking bracket 153 before it is completely locked by a screw (S). As illustrated in FIG. 7, the holding unit 170 includes a cut-off embossing unit 171 that is protrudingly formed on the base frame 101, and a suspension groove 173 that is formed at a predetermined distance apart from the cut-off embossing unit 171. The cut-off embossing unit 171 can be formed by punching or pressing the base frame 101 inward, and cutting off one side to form a groove 171a. Into this groove 171a is inserted a projection 153d formed at the end of the base 153a.

The suspension groove 173 starts at a corner or a boundary 101c between a bottom surface 101a of the base frame 101 and a bent part 101b that is bent almost perpendicularly from the bottom surface 101a. Then a projection 153e formed on the other end of the base 153a is inserted forcibly into the suspension groove 173 for support. Since the bent part 101b is somewhat elastically deformable, the projection 153e can press the inner side of the bent part 101b and be slid downward until it is inserted into the suspension groove 173.

The following will now explain a method for assembling the data recording/reproducing apparatus according to one embodiment of the present invention.

Figure 8:
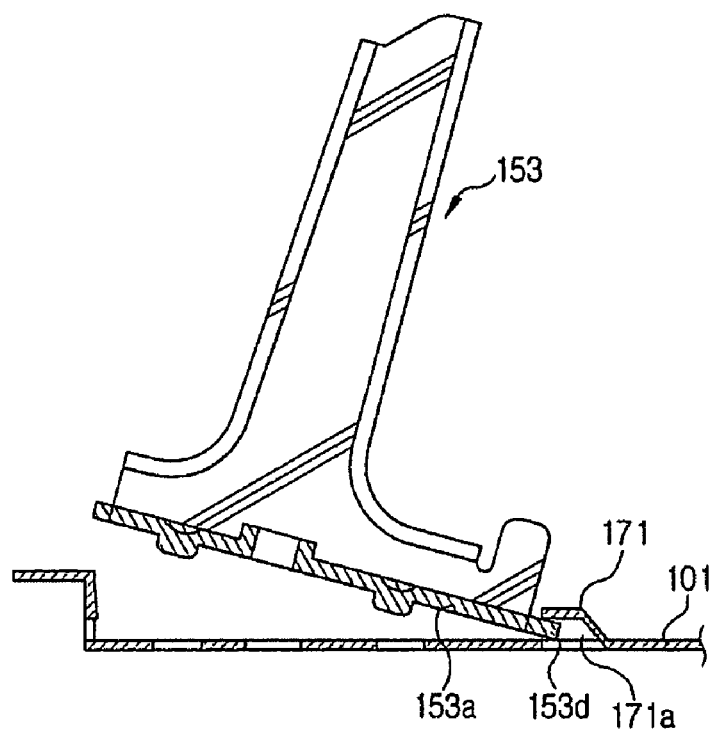
FIG. 8 to FIG. 10 illustrate, respectively, a procedure for connecting a locking bracket to a base frame.

At first, the DVD deck 110 is mounted on the base frame 101 as shown in FIG. 2. The locking bracket 153 is then temporarily connected to the base frame 101. In other words, as shown in FIG. 8, the projection 153d is inserted into the groove 171a of the embossing unit 171 on the base frame 101 while the base 153a is leaned slightly forward.

Figure 9:
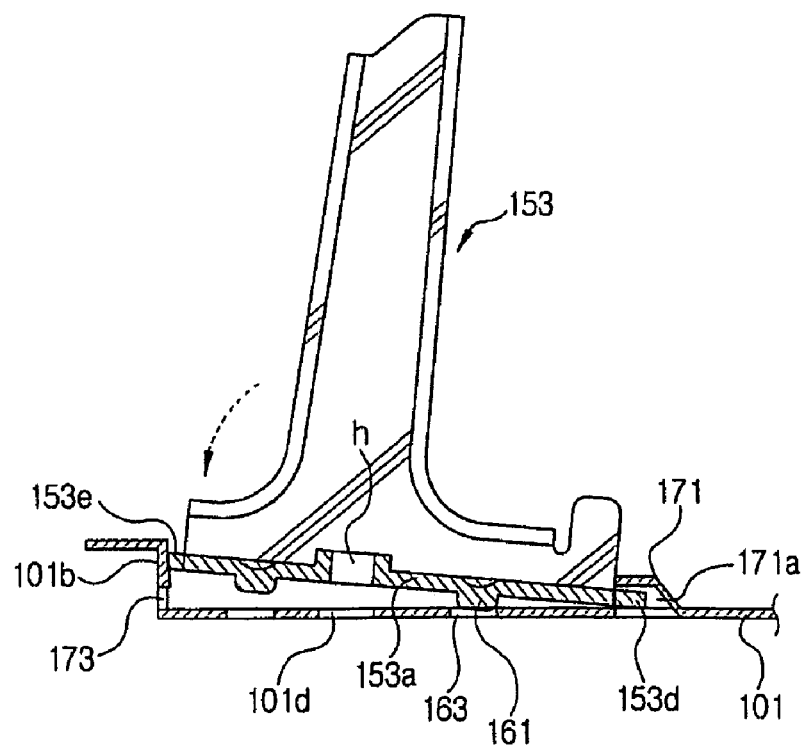

Next, as shown in FIG. 9, the locking bracket 153 is rotated so that the other projection 153e of the base 153a turns in the direction of an arrow (i.e., counterclockwise). As a result, the projection 153e moves downward while deforming the bent part 101b of the base frame 101, and is inserted forcibly into the suspension groove 173.

Figure 10:
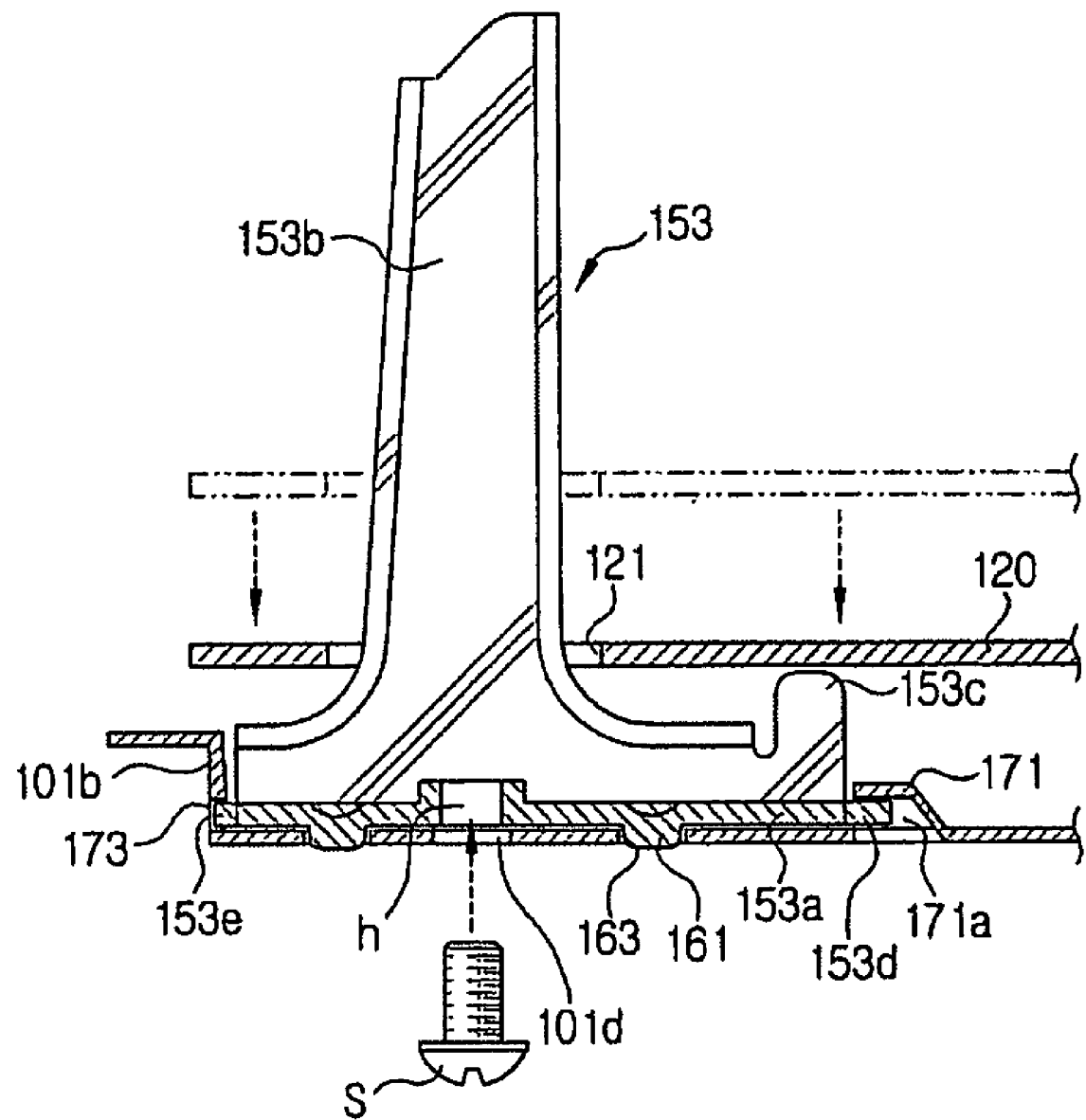

Afterwards, as shown in FIG. 10, the position determining projections 161 are inserted into the corresponding position determining grooves 163. And, the screw hole (h) in the base 153a coincides with the screw hole 101d formed in the base frame 101.

The circuit board 120 is installed on the locking bracket 153 while the locking bracket 153 is still being temporarily connected to the base frame 101. Then the locking caster 153b passes through the through hole 121 formed in the circuit board 120 and is exposed out of the circuit board 120. At this time, the circuit board 120, being separated from the base frame 101 by a predetermined height, is supported by the board support 153c.

After the DVD deck 110, the locking bracket 153, and the circuit board 120 are installed on the base frame 101, the front unit 130 is connected to the base frame 101.

More specifically, one side of the front unit 130 is connected to the DVD deck 110 by means of the first locking units 140 as shown in FIG. 4.

Later, the hook member 151 is locked into the locking bracket 153 as shown in FIG. 5. Once the front unit 130 is completely connected, the base frame 101 is turned over, and the base frame 101 and the locking bracket 153 are completely fixed by inserting the screw (S) into the corresponding hole. Also, legs are screwed into the bottom surface of the base frame 101. In effect, when the base frame 101 is turned over the legs can be easily assembled by screwing the locking bracket. Therefore, it is not necessary to turn the base frame 101 over simply to screw the locking bracket 153 thereto. Lastly, the rear frame 105 and the cover frame 103 are connected.

As such, one side of the front unit 130 is supported by the DVD deck 110, and the other side of the front unit 130 is supported by the second locking unit 150. In this manner, the front unit 130 can be stably supported in the longitudinal direction. Moreover, the hook member 151 and the locking bracket 153 are combined so firmly that the front unit 130 does not get bent or deformed easily even when the user hauls at the front unit 130 or grasps it.

In short, there is no space between the front unit 130 and the housing 100, and the deformation of the front unit 130 is prevented. In result, the reliability and stability of the product is improved markedly.

As described above, the locking bracket which is separately adoptable makes it possible to selectively lock the front unit into the base frame.

Although the DVD deck is installed closer to the edge on one side, the front unit is supported by the uniform locking force exerted at regular intervals.

Therefore, by suppressing the plastic deformation or bending of the front unit due to an external force, the front unit can be more firmly and stably locked into the housing without creating any gap therebetween.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A data recording/reproducing apparatus, comprising:
   an open front housing having a base frame and a cover frame;
   a recording/reproducing unit installed in the housing to record/reproduce data in/from a predetermined recording medium;
   a circuit board installed adjacent the recording/reproducing unit in the housing;
   a front unit connected to the open front of the housing to support operation buttons;
   a first locking unit which locks the front unit and the recording/reproducing unit; and
   a second locking unit which locks the front unit and the housing at a position corresponding to the circuit board.

2. The data recording/reproducing apparatus according to claim 1, wherein the second locking unit comprises:
   a hook member protrudingly formed from the front unit into the housing; and
   a locking bracket detachably installed in the housing to be combined with the hook member.

3. The data recording/reproducing apparatus according to claim 2, wherein the hook member is made of plastic materials, and has a locking hole where one end of the locking bracket is inserted.

4. The data recording/reproducing apparatus according to claim 2, wherein the locking bracket is installed in an upright position against the base frame.

5. The data recording/reproducing apparatus according to claim 4, wherein a holding unit in a predetermined shape is formed on the base frame to hold or support the locking bracket.

6. The data recording/reproducing apparatus according to claim 2, wherein the locking bracket is supported by the base frame, and the circuit board has a through hole for the locking bracket to pass through.

7. The data recording/reproducing apparatus according to claim 6, wherein the locking bracket comprises:
   a base adhered to the base frame;
   a locking caster that is bent at the base and extended upwards to a same height with the hook member; and a board support that is bent at the base at a predetermined height to support the circuit board.

8. The data recording/reproducing apparatus according to claim 7, wherein the base has a screw hole to screw the locking bracket to the base frame.

9. The data recording/reproducing apparatus according to claim 2, wherein a position determining unit is formed on the locking bracket and the base frame, respectively, to determine the installation position of the locking bracket to be reciprocably connected to the base frame.

10. The data recording/reproducing apparatus according to claim 2, wherein the front unit comprises:
a plastic front panel; and
a plastic rear panel connected to the rear side of the front panel and having the hook member.

11. The data recording/reproducing apparatus according to claim 1, wherein the recording/reproducing unit is a disc recording/reproducing unit.

12. The data recording/reproducing apparatus according to claim 1, wherein the recording/reproducing unit is installed more closely to an edge on one side of the housing, and the circuit board is installed more closely to an edge on the other side of the housing.

13. The data recording/reproducing apparatus of claim 1, wherein the recording/reproducing unit is a DVD (Digital Versatile Disc) deck.

14. The data recording/reproducing apparatus of claim 1, wherein the recording/reproducing unit is a VCR (Video Cassette Recorder) deck.

15. The data recording/reproducing apparatus of claim 1, wherein the recording/reproducing unit is a CD (Compact Disc) deck.

16. The data recording/reproducing apparatus of claim 1, wherein the recording/reproducing unit is an optical disc deck.

* * * * *